United States Patent
Kawahara et al.

[11] Patent Number: 6,154,382
[45] Date of Patent: Nov. 28, 2000

[54] HIGH-VOLTAGE POWER SUPPLY CIRCUIT HAVING A PLURALITY OF DIODE BRIDGES CONNECTED IN SERIES TO THE SECONDARY WINDING OF A TRANSFORMER

[75] Inventors: Takeshi Kawahara; Kurao Nakagawa, both of Tokyo, Japan

[73] Assignee: NEC Corporation, Tokyo, Japan

[21] Appl. No.: 09/404,378

[22] Filed: Sep. 24, 1999

[30] Foreign Application Priority Data

Sep. 30, 1998 [JP] Japan ................................ 10-278154

[51] Int. Cl.[7] .................................................... H02M 7/00
[52] U.S. Cl. .............................................. 363/68; 363/61
[58] Field of Search ................................ 363/68, 61, 59, 363/60, 126

[56] References Cited

U.S. PATENT DOCUMENTS 5,008,800  4/1991  Klinkowstein ............................ 363/61

FOREIGN PATENT DOCUMENTS 62-77059   4/1987  Japan .
61-166782  7/1987  Japan .
6-46563    2/1994  Japan .
08083593   3/1996  Japan .

*Primary Examiner*—Shawn Riley
*Attorney, Agent, or Firm*—Sughrue, Mion, Zinn, Macpeak & Seas, PLLC

[57] ABSTRACT

A high-voltage power supply circuit receives ac input, effects rectification and successive multiplication, and outputs a high dc voltage. The high-voltage power supply circuit includes a plurality of diode bridges connected to a secondary winding of a transformer, in series by way of capacitors, that effect full-wave rectification of an ac voltage outputted from the secondary winding. The high-voltage power supply circuit further includes a plurality of capacitors provided for each of the diode bridges that accumulate charges from the output voltage that has undergone full-wave rectification. Voltage that is a multiple of the maximum value of the ac voltage within the secondary winding and the number of stages of diode bridges (an integer multiple) is outputted at each of the connection points of the diode bridges.

24 Claims, 9 Drawing Sheets

HIGH-VOLTAGE POWER SUPPLY CIRCUIT HAVING A PLURALITY OF DIODE BRIDGES CONNECTED IN SERIES TO THE SECONDARY WINDING OF A TRANSFORMER

BACKGROUND OF THE INVENTION

1. Field of the Invention

The present invention relates to a high-voltage power supply circuit for effecting rectification and successive multiplication of an ac input and outputting a high-voltage direct current, and more particularly to a high-voltage power supply circuit suitable for supplying power to a traveling-wave tube that requires high voltage at a relatively low load current.

2. Description of the Related Art

Referring now to FIG. 1, an example of the prior art of this type of high-voltage power supply circuit comprises: transformer 100; diode bridges 111, 112, and 113; and capacitors C101, C102, and C103. Transformer 100 includes: primary winding 101 to which an ac voltage is applied; and first, second and third secondary windings 102, 103, and 104 formed from a number of turns according to the desired step-up voltage. Diode bridges 111, 112, and 113 effect full-wave rectification of the ac voltage outputted from first, second, and third secondary windings 102, 103, and 104. Capacitors C101–C103 reduce ripple in the dc voltage outputted from diode bridges 111–113, respectively. The output terminals of diode bridges 111–113 are connected to each other in series.

As an example, traveling-wave tube 120, which requires high voltage at a relatively low load current, is connected as the load to the high-voltage power supply circuit with the aforementioned type of construction shown in FIG. 1.

In other words, cathode terminal 121 of traveling-wave tube 120 is connected to one output terminal of diode bridge 111, and collector terminal 122 of traveling-wave tube 120 is connected both to the other output terminal of diode bridge 111 and to one output terminal of diode bridge 112. Collector terminal 123 of traveling-wave tube 120 is connected both to the other output terminal of diode bridge 112 and to one output terminal of diode bridge 113. Finally, the other output terminal of diode bridge 113 is connected to helix terminal 124 of traveling-wave tube 120.

The load current hereupon passes through collector terminal 122, collector terminal 123, and helix terminal 124 of traveling-wave tube 120 and flows to cathode terminal 121.

To obtain the high voltages that are applied to each of cathode terminal 121, collector terminal 122, and collector terminal 123 of traveling-wave tube 120 in the high-voltage power supply circuit shown in FIG. 1, transformer 100 includes three secondary windings 102, 103, and 104 corresponding to the applied voltages.

The turn ratio of the transformer is equal to the ratio of the voltage applied to the primary winding to the voltage generated at the secondary windings, and the greater the turn ratio or the greater the number of secondary windings, the larger the winding width or winding thickness required.

In addition, to allow use of the transformer at high voltages, a prescribed distance must be ensured between windings in the configuration shown in FIG. 1 to provide a high withstand voltage, and the bobbin or core of the transformer therefore must be made large. Increasing the size of the transformer core, however, both increases loss and reduces the transmission efficiency of the transformer.

Increasing the distance between windings, moreover, increases parasitic capacitance and also increases the spike voltage that occurs when diodes turn on or turn off.

Components such as the transformer, diodes, and capacitors used in the high-voltage power supply circuit of the prior art shown in FIG. 1 must have a high withstand voltage, and this results in increased circuit size and increased costs.

As one example for a solution, Japanese Patent Laid-open No. 77059/87 discloses the high-voltage power supply circuit shown in FIG. 2.

The high-voltage power supply circuit shown in FIG. 2 has one secondary winding of the transformer and a plurality (five in FIG. 2) of diode bridges at the winding ends of the secondary winding, these diode bridges being connected in series with interposed capacitors. Further, the output terminals of each diode bridge for outputting dc voltages are connected together in series as in the circuit of FIG. 1.

In addition, load $R_L$ is connected between output terminal $E_0$ of the diode bridge that is farthest of the plurality of diode bridges connected in series from the secondary winding of the transformer and the output terminal of the diode bridge that is closest to the secondary winding of the transformer.

With this configuration, a plurality of differing high voltages can be obtained from the connection points of the diode bridges even with only one secondary winding, and the circuit therefore can be used as the power supply of a traveling-wave tube that requires simultaneous supply of power to a plurality of loads.

In the high-voltage power supply circuit shown in FIG. 2, however, the grounding of the midpoint of the secondary winding of the transformer and the output terminal of the diode bridge that is closest to the secondary winding of the transformer results in a configuration having two Cockcroft-Walton circuits (see FIG. 3).

A Cockcroft-Walton circuit is a multiple-voltage circuit that effects half-wave rectification of the ac voltage $E_{in}$ outputted from the secondary winding by means of capacitors $C_1, C_2, \ldots C_N$, and diodes $D_1, D_2, \ldots D_N$. The circuit therefore has the problems of lower utilization ratio of the transformer and greater output voltage ripple than the high-voltage power supply circuit shown in FIG. 1 that effects full-wave rectification.

SUMMARY OF THE INVENTION

It is an object of the present invention to provide a high-voltage power supply circuit that is compact and has a low level of output voltage ripple.

According to one aspect of the present invention, the high-voltage power supply circuit comprises a transformer, a plurality of diode bridges, and a plurality of capacitors.

The plurality of diode bridges connected to the secondary winding of the transformer, are connected together in series by way of capacitors, and effect full-wave rectification of the ac voltage outputted from the secondary winding. Capacitors are provided for each diode bridge and store charges of output voltage that has undergone full-wave rectification. Of the plurality of diode bridges, the output terminal of the first-stage diode bridge closest to the secondary winding is connected to the ground potential, and load is connected between the ground potential and the output terminal of the last-stage diode bridge that is farthest from the secondary winding.

Accordingly, even though the transformer has only one secondary winding, a plurality of differing high voltages can be obtained from the connection points of the diode bridges.

In addition, the winding withstand voltage of the secondary winding of the transformer can be reduced because the conversion to high voltage of the output voltage is realized according to the number of stages of diode bridges.

Further, the voltages outputted from each of the connection points of the diode bridges are dc voltages that have been subjected to full-wave rectification, and the ripple of the output voltages can therefore be made lower than in a circuit that effects half-wave rectification.

This construction allows a reduction in the size of the transformer, diode bridges, and capacitors, and therefore allows both a decrease in the size of the overall circuit and a reduction in cost.

In a high-voltage power supply circuit according to another aspect of this invention, of the plurality of diode bridges, the output terminal of the first-stage diode bridge closest to the secondary winding includes a dc power supply for applying a desired dc voltage with respect to the ground potential, whereby voltage applied to load connected between the ground potential and the output terminal of the last-stage diode bridge that is farthest from the secondary winding can be set to a desired value.

In a high-voltage power supply circuit according to yet another aspect of the invention, the transformer has a second secondary winding and a rectifier circuit that rectifies the ac voltage outputted from the second secondary winding. As with the case that includes a dc power supply, this construction allows voltage that is applied to load connected between ground potential and the output terminal of the last-stage diode bridge that is farthest from the secondary winding to be set to a desired value.

The voltage that is applied to the cathode terminal of a traveling-wave tube therefore can be set so as to allow the traveling-wave tube to operate at highest efficiency, whereby the optimum cathode voltage can be applied to traveling-wave tubes of a variety of specifications.

Furthermore, the provision of a series regulator for outputting a finely adjusted voltage from the output voltage of a dc power supply or rectifier circuit allows the voltage that is applied to a traveling-wave tube, which is the load connected between the ground potential and the output terminal of the last-stage diode bridge that is farthest from the secondary winding, to be set to an optimum value.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

First Embodiment

Figure 4:
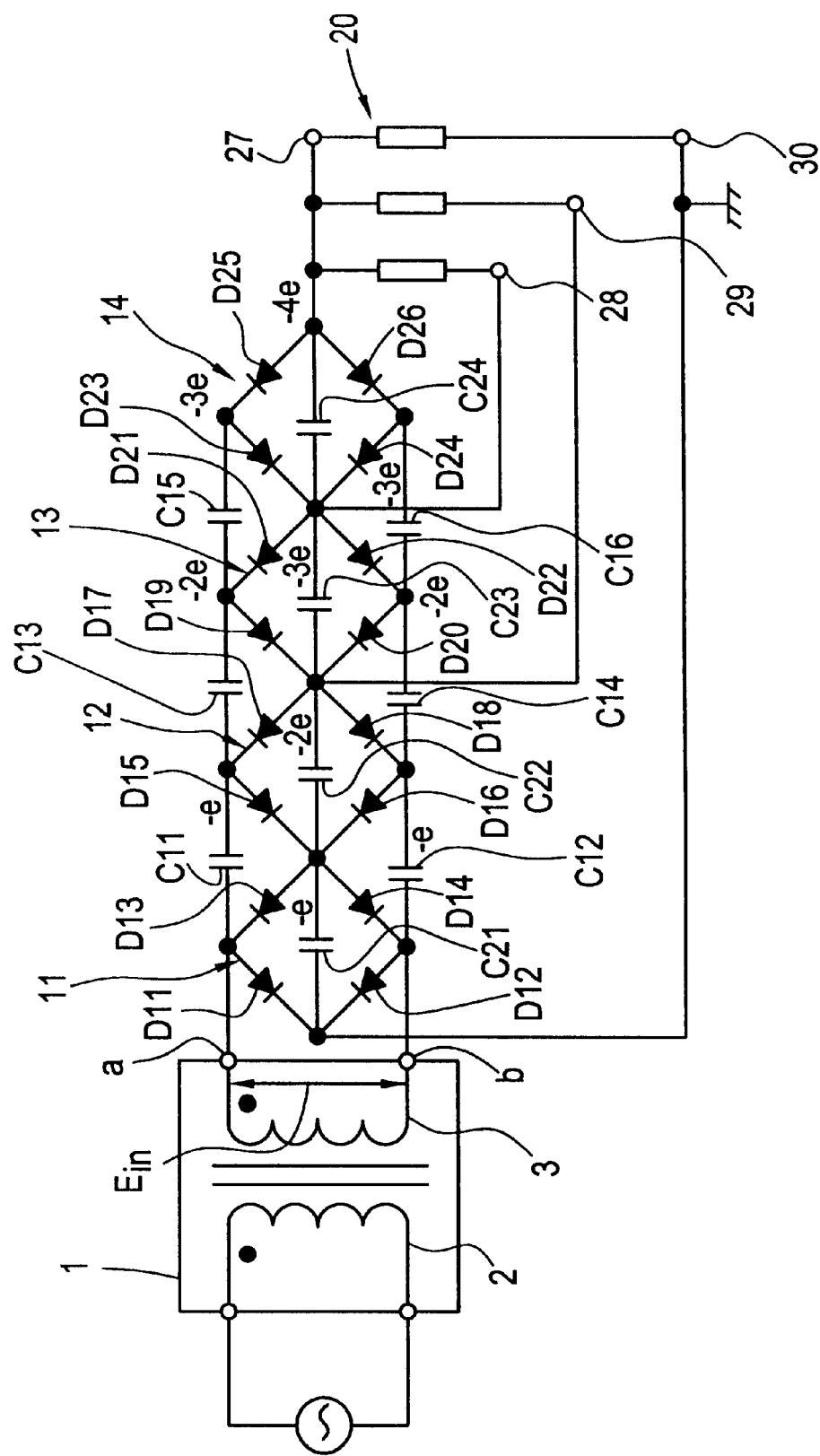
FIG. 4 is a circuit diagram of a high-voltage power supply circuit according to the first embodiment of the present invention.

Referring now to FIG. 4, there is shown a high-voltage power supply circuit according to the first embodiment of the present invention comprising transformer 1; diode bridges 11, 12, 13, and 14; and capacitors C11–C16 and C21–C24.

Transformer 1 comprises primary winding 2 to which is applied an ac voltage, and secondary winding 3 composed of a number of turns according to the desired step-up voltage. Diode bridges 11–14 effect full-wave rectification of the ac voltage outputted from secondary winding 3. Capacitors C11–C16 serve to accumulate the output voltage of diode bridges 11–14, and capacitors C21–C24 accumulate the charge by means of the output voltage of diode bridges 11–14.

Diode bridge 11 includes diodes D11 and D13 connected in series and diodes D12 and D14 connected in series, the cathodes of diodes D11 and D12 being connected together and the anodes of diodes D13 and D14 being connected together.

Diode bridge 12 includes diodes D15 and D17 connected in series and diodes D16 and D18 connected in series, the cathodes of diodes D15 and D16 being connected together and the anodes of diodes D17 and D18 being connected together.

Diode bridge 13 includes diodes D19 and D21 connected in series and diodes D20 and D22 connected in series, the cathodes of diodes D19 and D20 being connected together and the anodes of diodes D21 and D22 being connected together.

Finally, diode bridge 14 includes diodes D23 and D25 connected in series and diodes D24 and D26 connected in series, the cathodes of diodes D23 and D24 being connected together and the anodes of diodes D25 and D26 being connected together.

Figure 5:
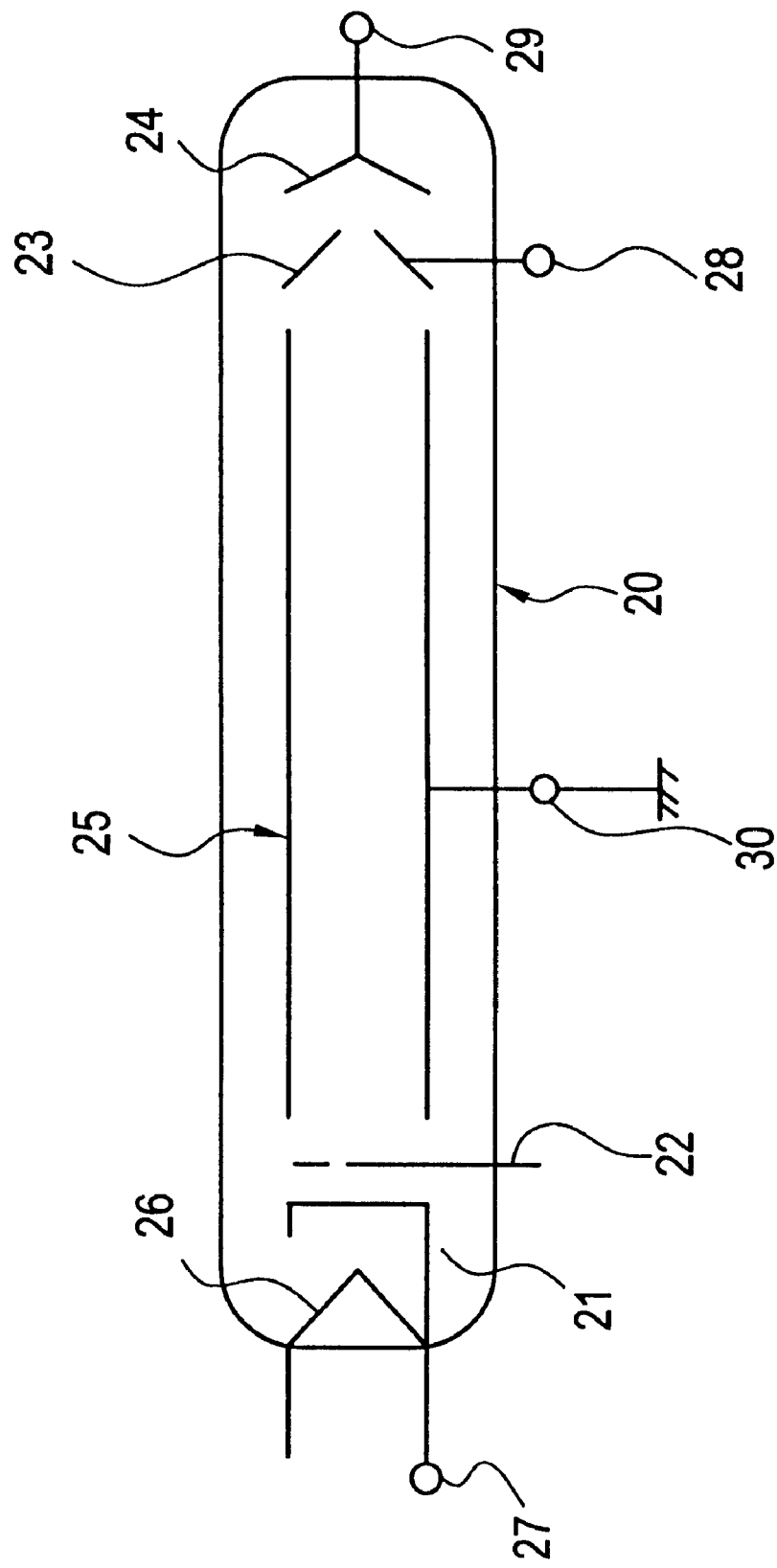
FIG. 5 is a schematic view of a traveling-wave tube, which is the load of the high-voltage power supply circuit shown in FIG. 4.

Traveling-wave tube 20 having two collectors such as shown in FIG. 5 is connected as load to the high-voltage power supply circuit of this embodiment.

Traveling-wave tube 20 consists of: cathode 21 that discharges an electron beam; anode 22 that focuses the electron beam discharged from cathode 21; collectors 23 and 24 that absorb the electron beam discharged from cathode 21; and helix 25 that amplifies the electromagnetic waves received inside. In addition, heater 26 is disposed so as to give energy to electrons in the vicinity of cathode 21.

Voltage is applied from the outside to cathode 21 by way of cathode terminal 27. Voltage is similarly applied from the outside to collector 23 by way of collector terminal 28, to collector 24 by way of collector terminal 29, and to helix 25 by way of helix terminal 30.

The electron beam discharged from cathode 21 is focused by anode 22, passes within the arc of helix 25, and is absorbed by collector 23 and collector 24. In contrast, electromagnetic waves received from the side of cathode 21 are decelerated within helix 25 and are propagated in the direction of collector 23 at a slightly slower speed than the electron beam. Under these circumstances, mutual interference is generated within helix 25 between electromagnetic waves and the electron beam discharged from cathode 21, and the electromagnetic waves, receiving energy from the electron beam, are amplified.

Although traveling-wave tube 20 shown in FIG. 5 presents a case in which there are two collectors, the number of collectors is not limited to two. An increase in the number of collectors brings about an improvement in the absorption factor of the electron beam discharged from cathode 21, and consequently, a decrease in the loss of traveling-wave tube 20.

However, too many collectors necessitates a higher voltage of cathode 21 with respect to helix 25 and a corresponding increase in the number voltages necessary for collectors, thus increasing the scale of the high-voltage power supply circuit. The number of collectors is therefore optimally set with due consideration given to the performance demanded of the traveling-wave tube.

Cathode terminal 27 of traveling-wave tube 20 is connected to the output terminal of diode bridge 14 that is not connected to diode bridge 13, and collector terminal 28 of traveling-wave tube 20 is connected to the connection point of diode bridge 13 and diode bridge 14.

In addition, collector terminal 29 of traveling-wave tube 20 is connected to the connection point of diode bridge 12 and diode bridge 13, and further, the output terminal of diode bridge 11 that is not connected to diode bridge 12 is both grounded and connected to helix terminal 30 of traveling-wave tube 20.

The operation of the high-voltage power supply circuit of this embodiment will now be described.

When ac voltage is supplied from the winding end of primary winding 2 of transformer 1, ac voltage $E_{in}$ (with a maximum value of $-e[V]$ according to the turn ratio is generated between winding ends a and b of secondary winding 3.

In the half-period of ac voltage $E_{in}$ in which the voltage of winding end a is positive with respect to the voltage of winding end b, a current flows through diode D11, capacitor C21, and diode D14, and capacitor C21 is charged to the maximum value $-e[V]$ of ac voltage $E_{in}$. At the same time, a current flows through capacitor C11, diode D15, and diode D14, and capacitor C11 is charged to the maximum value $-e[V]$ of ac voltage $E_{in}$.

On the other hand, in the half-period of ac voltage $E_{in}$ in which the voltage of winding end a is negative with respect to the voltage of winding end b, a current flows through diode D12, capacitor C21, and diode D13 and capacitor C21 is charged to the maximum value $-e[V]$ of ac voltage $E_{in}$. At the same time, a current flows through capacitor C12, diode D16, and diode D13, and capacitor C12 is charged to the maximum value $-e[V]$ of ac voltage $E_{in}$.

Accordingly, dc voltage $-e[V]$, which is the result of full-wave rectification of ac voltage $E_{in}$, is generated at both ends of capacitor C11, capacitor C12, and capacitor C21.

In addition, in the half-period of ac voltage $E_{in}$ in which the voltage of winding end a is positive with respect to the voltage of winding end b, a current flows through capacitor C11, diode D15, capacitor C22, and diode D18, and capacitor C22 is charged to the maximum value $-e[V]$ of ac voltage $E_{in}$. Simultaneously, a current flows through capacitor C11, capacitor C13, diode D19, and diode D18, and capacitor C13 is charged to the maximum value $-e[V]$ of ac voltage $E_{in}$.

Accordingly, dc voltage $-e[V]$, which is the result of full-wave rectification of ac voltage $E_{in}$, is generated at both ends of capacitor C11, capacitor C12, and capacitor C21.

In the half-period of ac voltage $E_{in}$ in which the voltage of winding end a is positive with respect to the voltage of winding end b, a current flows through capacitor C11, diode D15, capacitor C22, and diode D18, and capacitor C22 is charged to the maximum value $-e[V]$ of ac voltage $E_{in}$. At the same time, a current flows through capacitor C11, capacitor C13, diode D19, and diode D18, and capacitor C13 is charged to the maximum value $-e[V]$ of ac voltage $E_{in}$.

On the other hand, in the half-period of ac voltage $E_{in}$ in which the voltage of winding end a is negative with respect to the voltage of winding end b, a current flows through capacitor C12, diode D16, capacitor C22, and diode D17, and capacitor C22 is charged to the maximum value $-e[V]$ of ac voltage $E_{in}$. At the same time, a current flows through capacitor C12, capacitor C14, diode D20, and diode D17, and capacitor C14 is charged to the maximum value $-e[V]$ of ac voltage $E_{in}$.

The connection point of diode bridge 11 and diode bridge 12 is held at $-e[V]$ by capacitor C11, capacitor C12, and capacitor C21, and a voltage of $-2e[V]$ is therefore generated at the connection point of diode bridge 12 and diode bridge 13.

In the half-period of ac voltage $E_{in}$ in which the voltage of winding end a is positive with respect to the voltage of winding end b, a current flows through capacitor C11, capacitor C13, diode D19, capacitor C23, and diode D22, and capacitor C23 is charged to the maximum value $-e[V]$ of ac voltage $E_{in}$. At the same time, a current flows through capacitor C11, capacitor C13, capacitor C15, diode D23, and diode D22, and capacitor C15 is charged to the maximum value $-e[V]$ of ac voltage $E_{in}$.

In addition, in the half-period of ac voltage $E_{in}$ in which the voltage of winding end a is negative with respect to the voltage of winding end b, a current flows through capacitor C12, capacitor C14, diode D20, capacitor C23, and diode D21, and capacitor C23 is charged to the maximum value $-e[V]$ of ac voltage $E_{in}$. At the same time, a current flows through capacitor C12, capacitor C14, capacitor C16, diode D24, and diode D21, and capacitor C16 is charged to the maximum value $-e[V]$ of ac voltage $E_{in}$.

The connection point of diode bridge 12 and diode bridge 13 is held at $-2e[V]$ by capacitors C11–C14, capacitor C21, and capacitor C22, and a voltage of $-3e[V]$ is therefore generated at the connection point of diode bridge 13 and diode bridge 14.

Similarly, in the half-period of ac voltage $E_{in}$ in which the voltage of winding end a is positive with respect to the voltage of winding end b, a current flows through capacitor C11, capacitor C13, capacitor C15, diode D23, capacitor C24, and diode D26, and capacitor C24 is charged to the maximum value $-e[V]$ of ac voltage $E_{in}$.

On the other hand, in the half-period of ac voltage $E_{in}$ in which the voltage of winding end a is negative with respect to the voltage of winding end b, current flows through capacitor C12, capacitor C14, capacitor C16, diode D24, capacitor C24, and diode D25, and capacitor C24 is charged to the maximum value $-e[V]$ of ac voltage $E_{in}$.

The connection point of diode bridge 13 and diode bridge 14 is held at $-3e[V]$ by capacitors C11–C16 and capacitors C21–C23, and a voltage of $-4e[V]$ is therefore generated at the output terminal of diode bridge 14 that is not connected to diode bridge 13.

In other words, voltages that are (integer) multiples of the maximum value $-e[V]$ of the ac voltage $E_{in}$ in the secondary winding and the number of stages of diode bridges are outputted between grounded helix terminal 30 and the connection points of the diode bridges.

Accordingly, this embodiment enables a plurality of differing high voltages to be obtained from the connection points of the diode bridges even with a single secondary winding, and a high-voltage power supply circuit can therefore be used as a power supply for a traveling-wave tube that requires that power be supplied simultaneously to a plurality of loads.

Figure 1:
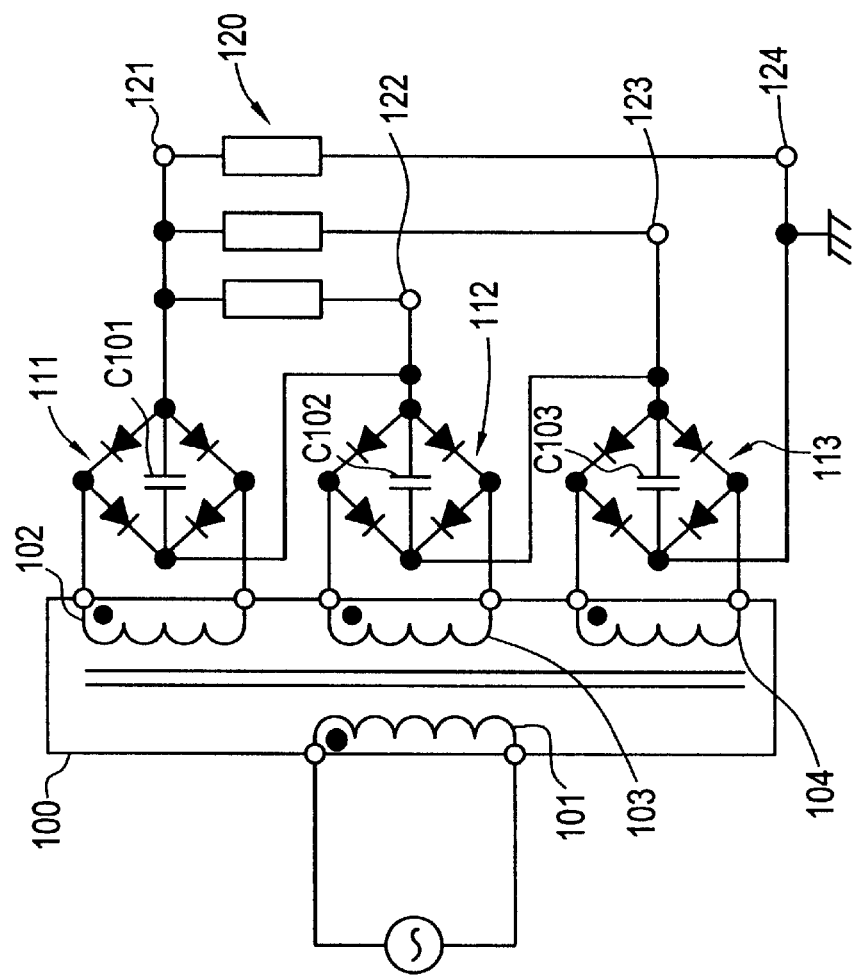
FIG. 1 is a circuit diagram showing a prior-art example of a high-voltage power supply circuit.

Moreover, since a single transformer secondary winding can suffice, the transformer can be made smaller than the high-voltage power supply circuit shown in FIG. 1

In addition, the transformer can be made still smaller because output voltage is increased according to the number of stages of diode bridges, thereby allowing a decrease in the winding withstand voltage of the secondary winding of the transformer.

The voltage outputted from each connection point of the diode bridges is a dc voltage that has been subjected to full-wave rectification, and ripple voltage can therefore be reduced from that of the prior-art high-voltage power supply circuit shown in FIG. 1.

In the configuration shown in FIG. 4, however, cathode terminal 27 of traveling-wave tube 20 is connected to the output terminal of diode bridge 14 that is not connected to diode bridge 13, collector terminal 28 of traveling-wave tube 20 is connected to the connection point between diode bridge 13 and diode bridge 14, and collector terminal 29 of traveling-wave tube 20 is connected to the connection point between diode bridge 12 and diode bridge 13.

As a result, more load current flows with increasing distance of the latter-stage diode bridges from secondary winding 3 of transformer 1 in the high-voltage power supply circuit of this embodiment.

In this configuration, the use of capacitors having little loss for capacitors C11–C16 and C21–C24 is preferable from the standpoint of preventing voltage drops. For capacitors C11–C16 and C21–C24 this embodiment employs multilayer ceramic capacitors, for which advances in loss reduction have been made in recent years. Multilayer ceramic capacitors can be selected which are smaller and have higher withstand voltage than mica paper capacitors or film capacitors having the same electrostatic capacity. The use of multilayer ceramic capacitors therefore allows the construction of an even more compact high-voltage power supply circuit.

Figure 2:
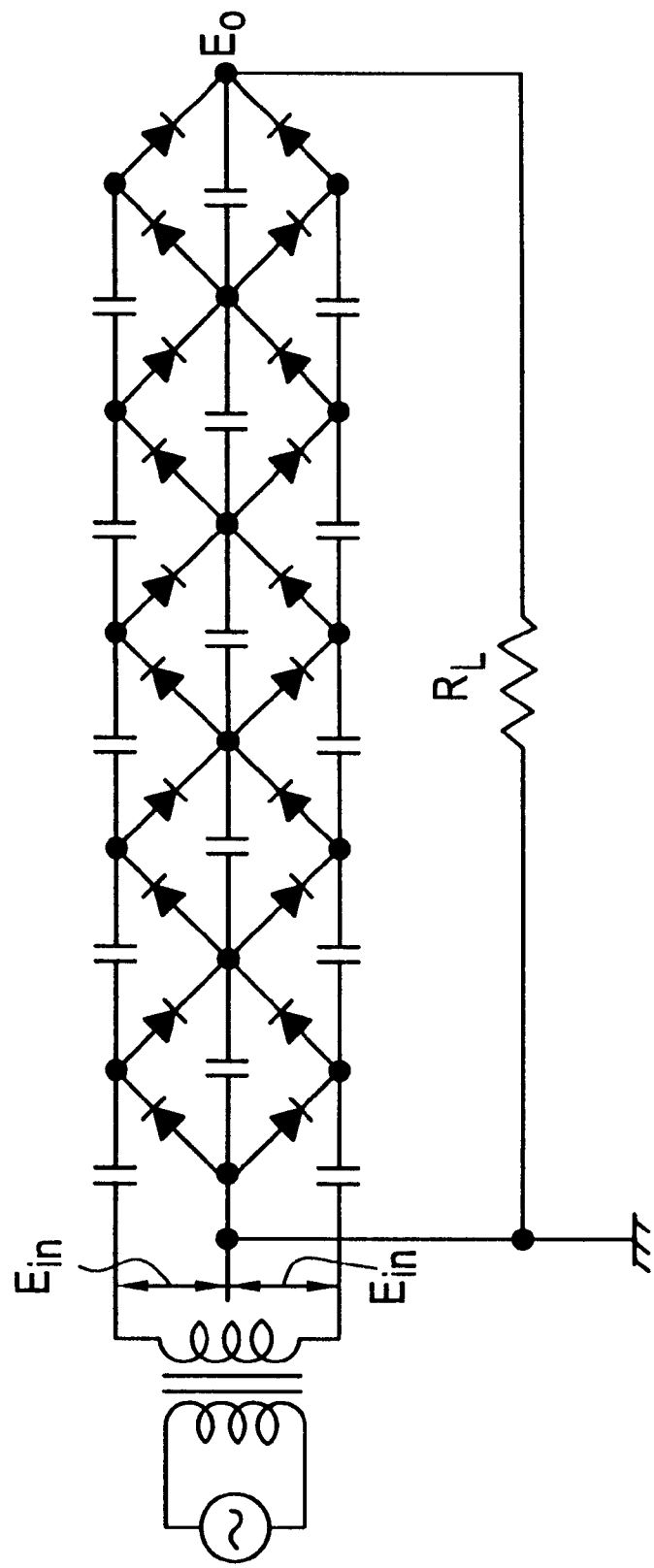
FIG. 2 is a circuit diagram showing another prior-art example of a high-voltage power supply circuit.
Figure 3:
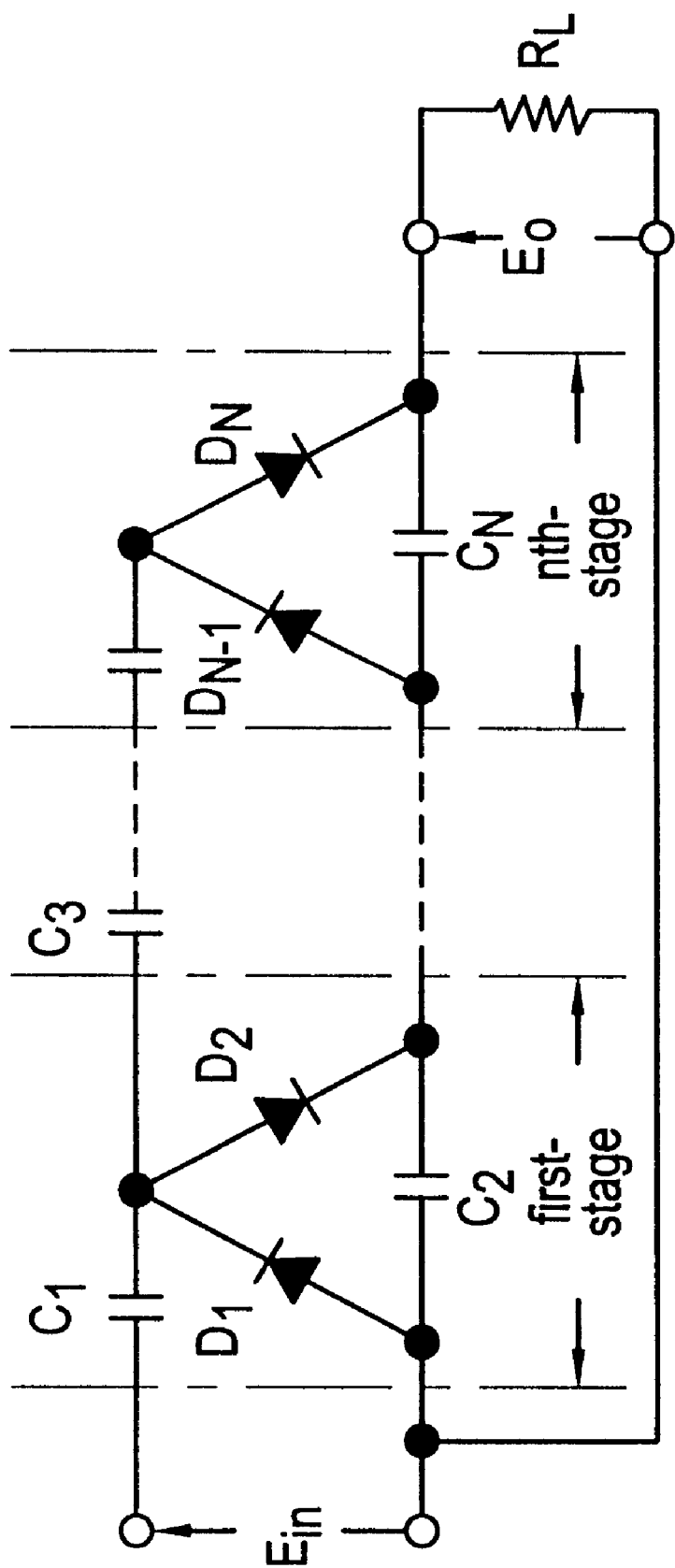
FIG. 3 is a circuit diagram of a Cockcroft-Walton circuit, which is one example of a multiple-voltage circuit.

In the configuration shown in FIG. 4, moreover, the voltage applied to capacitors C11–C16 and C21–C24 and to diodes D11–D26 is the addition result of e[V] and the ripple voltage. Therefore, to the extent that ripple voltage can be reduced as compared to the circuit of the prior art shown in FIG. 2, components having a low reverse withstand voltage can be selected as diodes and components having low withstand voltage can be selected as capacitors in the high-voltage power supply circuit of this embodiment.

Diodes and capacitors having low withstand voltage are generally smaller and less expensive than those having high withstand voltage. Consequently, the high-voltage power supply circuit of this embodiment can be made smaller and at a lower cost than the prior-art high-voltage power supply circuit shown in FIG. 2. In addition, diodes and capacitors can be expected to last longer if the ripple voltage is small.

Finally, the lower spike voltage that is generated each time a diode is turned on or turned off means that additional circuits such as snubber circuits for eliminating spike voltage are no longer needed, thereby allowing a further reduction in the number of components and a more compact power supply circuit.

In particular, since snubber circuits are circuits that reduce spike voltage by consuming the energy of the spike voltage as effective power, the elimination of the need for snubber circuits contributes to greater efficiency of voltage conversion, and the use of a smaller transformer allows a more compact and less expensive construction of the overall circuit.

In this embodiment, moreover, anode 22 of traveling-wave tube 20 shown in FIG. 5 is grounded and heater 26 draws power from another power supply (not shown). Although FIG. 4 shows a configuration in which four diode bridges are connected in series, the number of diode bridges is not limited to four. FIG. 4 shows a circuit configuration for a case in which traveling-wave tube 20, which is the load, has two collectors, but the number of diode bridges can be increased to handle a case in which power is supplied to a traveling-wave tube having three or more collectors.

Second Embodiment

Figure 6:
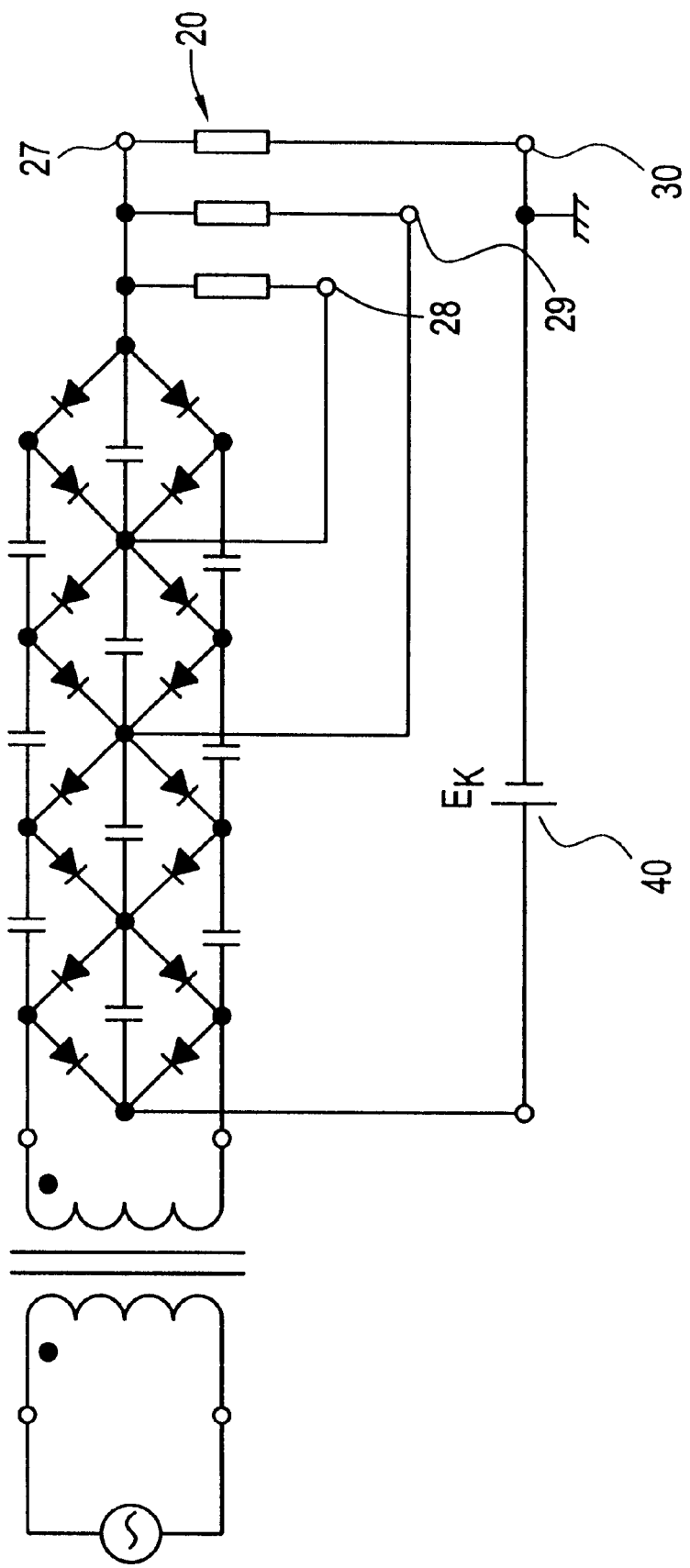
FIG. 6 is a circuit diagram of a high-voltage power supply circuit according to the second embodiment of the present invention.

Referring now to FIG. 6, the high-voltage power supply circuit according to the second embodiment of the present invention includes dc power supply 40 for supplying a prescribed dc voltage $E_k$ between the output terminal of diode bridge 11 and helix terminal 30 of the high-voltage power supply circuit shown in the first embodiment. The construction is otherwise the same as that of the first embodiment, and explanation is therefore here omitted.

According to this embodiment, the potential of cathode terminal 27 of traveling-wave tube 20, which is the load, can be set to a desired value by means of the output voltage of dc power supply 40.

Normally, the voltage applied to cathode terminal 27 of traveling-wave tube 20 must be set to a value that enables traveling-wave tube 20 to operate at highest efficiency. In the high-voltage power supply circuit of the first embodiment, only voltages that are an integer multiple of the output voltage of secondary winding 3 of transformer 1 can be applied to cathode terminal 27, collector terminal 28, and collector terminal 29, and this power supply circuit therefore can be used only for traveling-wave tubes that deliver optimum operation at voltages that are such integer multiples. When the high-voltage power supply circuit of the first embodiment is used with a traveling-wave tube with specifications that do not conform, the efficiency of the traveling-wave tube may suffer.

According to the high-voltage power supply circuit of this embodiment, on the other hand, dc power supply 40 allows the voltage applied to cathode terminal 27 to be set such that traveling-wave tube 20 operates at highest efficiency, and the optimum cathode voltage therefore can be applied to traveling-wave tubes of a variety of specifications.

Third Embodiment

Figure 7:
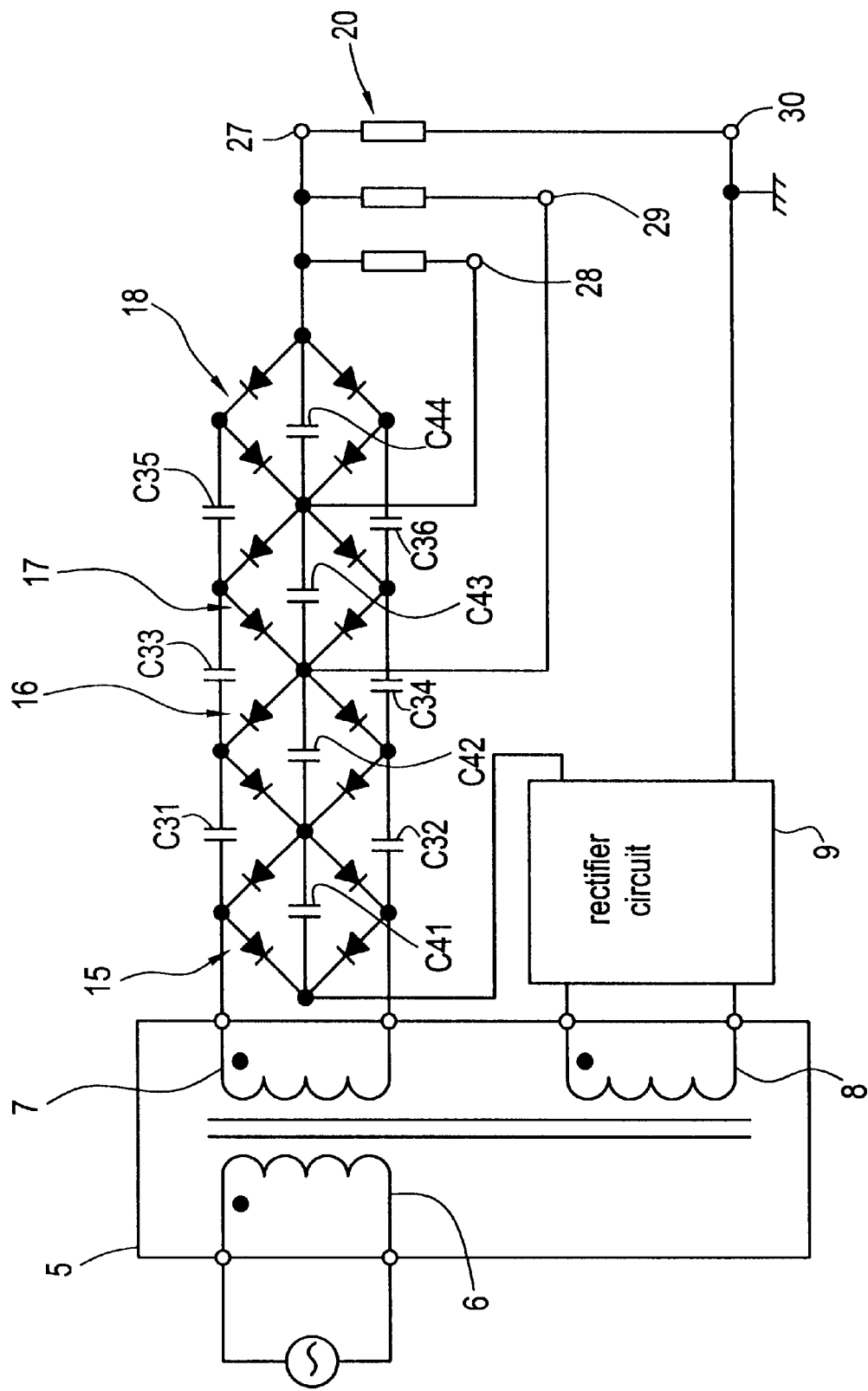
FIG. 7 is a circuit diagram showing a high-voltage power supply circuit according to the third embodiment of the present invention.

Referring now to FIG. 7, the high-voltage power supply circuit according to the third embodiment of the present invention comprises transformer 5, diode bridges 15–18, capacitors C31–36 and C41–C44, and rectifier circuit 9.

Transformer 5 comprises: primary winding 6 to which an ac voltage is applied; and first secondary winding 7 and second secondary winding 8 made up of a number of turns according to the desired step-up voltage. Diode bridges 15–18 have output terminals for outputting dc voltage that are connected in series and that effect full-wave rectification of each ac voltage outputted from first secondary winding 7. Capacitors C31–C36 are inserted between each of diode bridges 15–18 and serve to accumulate the output voltage of diode bridges 15–18. Capacitors C41–C44 store charge by the output voltage of diode bridges 15–18. Rectifier circuit 9 rectifies the ac voltage outputted from second secondary winding 8.

In addition, the output terminal of diode bridge 15 that is not connected to diode bridge 16 is connected to one output terminal of rectifier circuit 9, and the other output terminal of rectifier circuit 9 is grounded.

As in the first and second embodiments, traveling-wave tube 20 having two collectors is connected as load to the high-voltage power supply circuit of this embodiment.

Cathode terminal 27 of traveling-wave tube 20 is connected to the output terminal of diode bridge 18 that is not connected to diode bridge 17, and collector terminal 28 of traveling-wave tube 20 is connected to the connection point between diode bridge 17 and diode bridge 18. Collector terminal 29 of traveling-wave tube 20 is connected to the connection point between diode bridge 16 and diode bridge 17. Finally, helix terminal 30 is grounded.

The operation of the multiple-voltage circuit made up of diode bridges 15–18, capacitors C31–C36 and capacitors C41–C44 is equivalent to that of the first embodiment, and explanation is therefore omitted.

As with the second embodiment, this embodiment allows the voltage applied to cathode terminal 27 of traveling-wave tube 20 to be set to a desired value by means of the output voltage of rectifier circuit 9, thereby allowing the cathode voltage to be set to the optimum setting for the most efficient operation of traveling-wave tube 20.

However, the withstand voltage of second secondary winding 8 of this embodiment must be increased because due consideration must be given to the output voltages of diode bridges 15–18 connected to first secondary winding 7.

The number of turns of second secondary winding 8 is preferably suppressed to a minimum in order to keep transformer 5 compact.

Figure 8:
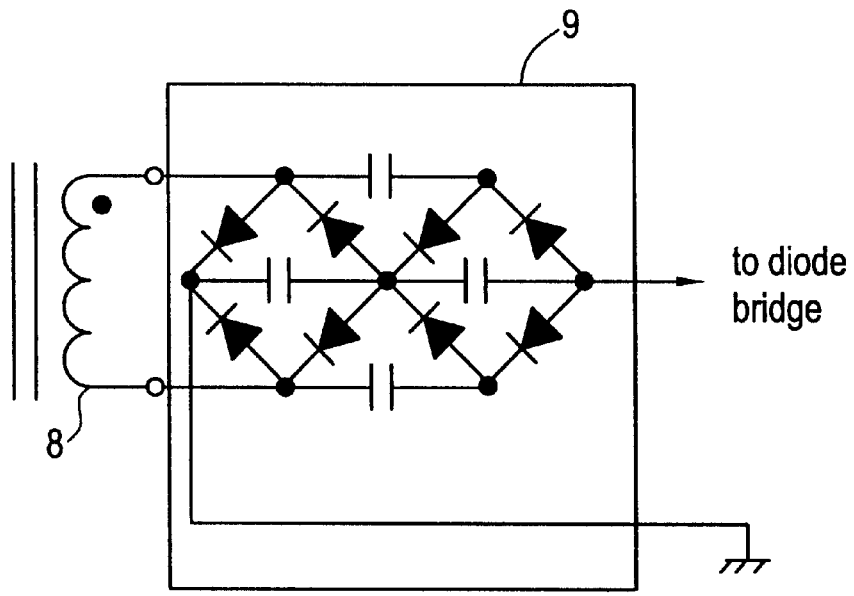
FIG. 8 is a circuit diagram showing an example of the rectifier circuit shown in FIG. 7.
Figure 9:
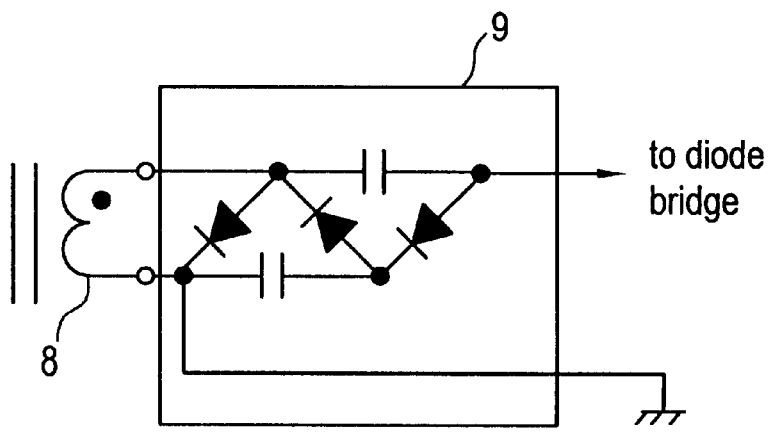
FIG. 9 is a circuit diagram showing another example of the rectifier circuit shown in FIG. 7.

Finally, a multiple-voltage circuit by full-wave rectification as shown in FIG. 8 or a multiple-voltage circuit composed of a Cockcroft-Walton circuit as shown in FIG. 9 may be used for rectifier circuit 9.

Fourth Embodiment

Figure 10:
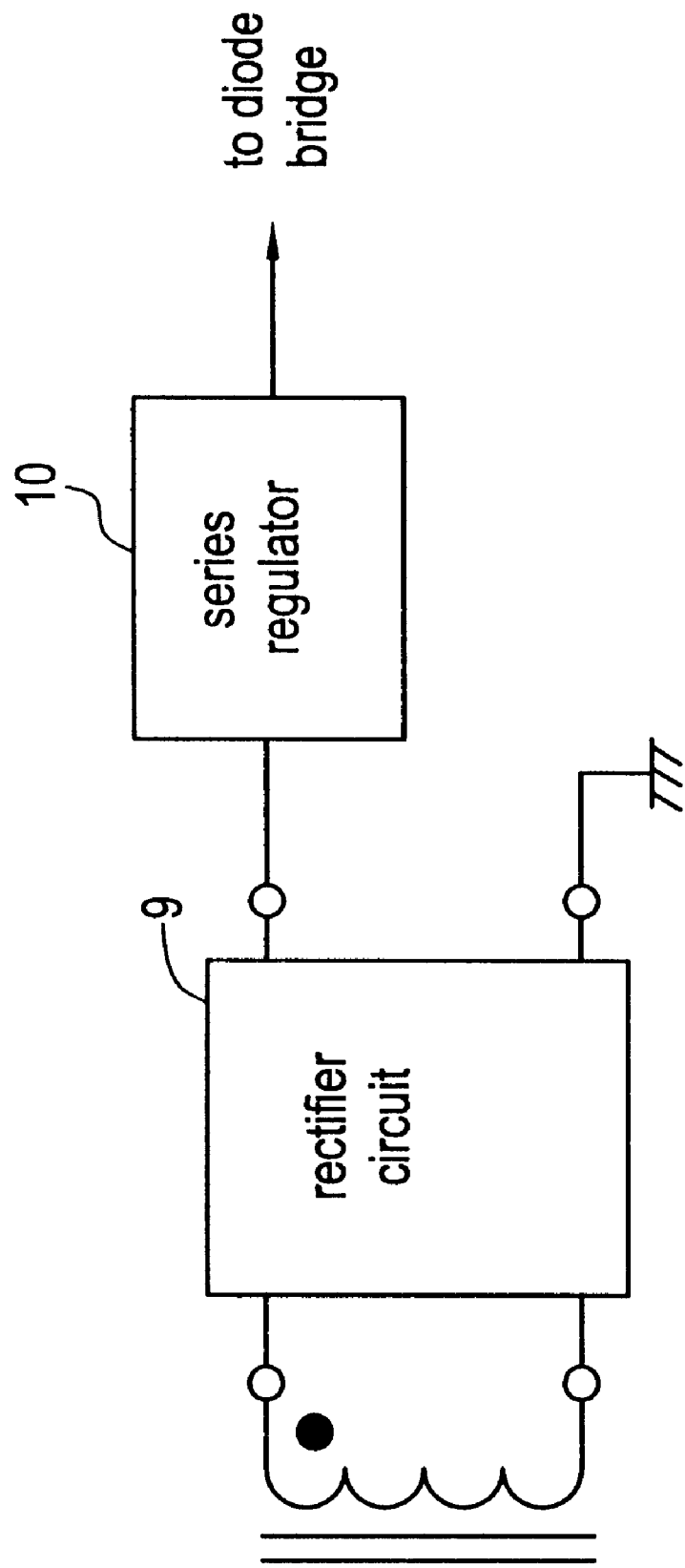
FIG. 10 is a circuit diagram of a high-voltage power supply circuit according to the fourth embodiment of the present invention.

Referring now to FIG. 10, the high-voltage power supply circuit according to the fourth embodiment of the present invention has series regulator 10, which is capable of fine adjustment of output voltage, connected to the output of rectifier circuit 9 shown in the third embodiment. The construction is otherwise equivalent to that of the third embodiment, and further explanation is therefore omitted.

The use of series regulator 10 in this embodiment enables the output of even more finely adjusted voltage from the output voltage of rectifier circuit 9, and the voltage applied to cathode terminal 27 of traveling-wave tube 20 therefore can be set to a more optimal value than in the third embodiment.

A construction is shown in FIG. 10 in which series regulator 10 is connected on the output side of rectifier circuit 9 shown in the third embodiment, but a construction is also possible in which series regulator 10 is connected on the output side of dc power supply 40 shown in the second embodiment. In this case as well, the voltage applied to cathode terminal 27 of traveling-wave tube 20 can be set to a more optimal value than in the second embodiment.

While preferred embodiments of the present invention have been described using specific terms, such description is for illustrative purposes only, and it is to be understood that changes and variations may be made without departing from the spirit or scope of the following claims.

What is claimed is:

1. A high-voltage power supply circuit that effects rectification and successive multiplication of an ac input, and outputs a high dc voltage, comprising:

a transformer including a primary winding to which an ac voltage is applied, and one secondary winding formed of a number of turns according to a desired step-up voltage;

a plurality of diode bridges connected in series via a first plurality of capacitors with said secondary winding for effecting full-wave rectification of ac voltage outputted from said secondary winding;

a second plurality of capacitors respectively provided for said diode bridges for accumulating charges by output voltage that has undergone said full-wave rectification; and means for connecting a load between ground potential and an output terminal of a last-stage diode bridge farthest from said secondary winding, wherein, of said plurality of diode bridges, an output terminal of a first-stage diode bridge closest to said secondary winding is connected to said ground potential, and a midpoint of said secondary winding is not connected to said ground potential.

2. A high-voltage power supply circuit according to claim 1, wherein said load is connected between said output terminal of said last-stage diode bridge and an output terminal of a diode bridge that is a desired number of stages in a direction away from said last-stage diode bridge toward said first-stage diode bridge.

3. A high-voltage power supply circuit according to claim 1, further comprising a dc power supply for applying a desired dc voltage with respect to said ground potential to said output terminal of said first-stage diode bridge closest to said secondary winding.

4. A high-voltage power supply circuit according to claim 2, further comprising a dc power supply for applying a desired dc voltage with respect to said ground potential to said output terminal of said first-stage diode bridge closest to said secondary winding.

5. A high-voltage power supply circuit according to claim 3, further comprising series regulator disposed between said output terminal of said first-stage diode bridge and said dc power supply for outputting a more finely adjusted voltage from an output voltage of said dc power supply.

6. A high-voltage power supply circuit according to claim 4, further comprising a series regulator disposed between said output terminal of said first-stage diode bridge and said dc power supply for outputting a more finely adjusted voltage from the output voltage of said dc power supply.

7. A high-voltage power supply circuit according to claim 1, wherein said load is a traveling-wave tube.

8. A high-voltage power supply circuit according to claim 1, wherein said capacitors are multilayer ceramic capacitors.

9. A high-voltage power supply circuit for effecting rectification and successive multiplication of an ac input and outputs a high dc voltage, said circuit comprising:

a transformer including a primary winding to which an ac voltage is applied, and a first secondary winding and a second secondary winding formed of a number of turns according to a desired step-up voltage;

a plurality of diode bridges connected in series via a first plurality of capacitors with said first secondary winding for effecting full-wave rectification of ac voltage outputted from said first secondary winding;

a second plurality of capacitors respectively provided for said diode bridges for accumulating charge by output voltage that has undergone said full-wave rectification;

a rectifier circuit having one output terminal thereof connected to an output terminal of a first-stage diode bridge closest to said secondary winding, and the other output terminal thereof connected to ground potential for rectifying ac voltage outputted from said second secondary winding; and means for connecting a load between said ground potential and an output terminal of a last-stage diode bridge farthest from said secondary winding.

10. A high-voltage power supply circuit according to claim 9, wherein said load is connected between said output terminal of said last-stage diode bridge and an output terminal of a diode bridge that is a desired number of stages in a direction away from said last-stage diode bridge toward said first-stage diode bridge.

11. A high-voltage power supply circuit according to claim 9, further comprising a series regulator disposed between said output terminal of said first-stage diode bridge and said rectifier circuit for outputting a more finely tuned voltage from an output voltage of said rectifier circuit.

12. A high-voltage power supply circuit according to claim 10, further comprising a series regulator disposed between said output terminal of said first-stage diode bridge and said rectifier circuit for outputting a more finely tuned voltage from an output voltage of said rectifier circuit.

13. A high-voltage power supply circuit according to claim 9, wherein said rectifier circuit comprises:

a second plurality of diode bridges connected in series via a third plurality of capacitors with said second secondary winding for effecting full-wave rectification of ac voltage outputted from said second secondary winding; and a fourth plurality of capacitors respectively provided for said second plurality of diode bridges for accumulating charges by output voltage that has undergone said full-wave rectification.

14. A high-voltage power supply circuit according to claim 10, wherein said rectifier circuit comprises:

a second plurality of diode bridges connected in series via a third plurality of capacitors with said second secondary winding for effecting full-wave rectification of ac voltage outputted from said second secondary winding; and a fourth plurality of capacitors respectively provided for said second plurality of diode bridges for accumulating charges by output voltage that has undergone said full-wave rectification.

15. A high-voltage power supply circuit according to claim 11, wherein said rectifier circuit comprises:

a second plurality of diode bridges connected in series via a third plurality of capacitors with said second secondary winding for effecting full-wave rectification of ac voltage outputted from said second secondary winding; and a fourth plurality of capacitors respectively provided for said second plurality of diode bridges for accumulating charges by output voltage that has undergone said full-wave rectification.

16. A high-voltage power supply circuit according to claim 12, wherein said rectifier circuit comprises:

a second plurality of diode bridges connected in series via a third plurality of capacitors with said second secondary winding for effecting full-wave rectification of ac voltage outputted from said second secondary winding; and a fourth plurality of capacitors respectively provided for said second plurality of diode bridges for accumulating charges by output voltage that has undergone said full-wave rectification.

17. A high-voltage power supply circuit according to claim 9, wherein said rectifier circuit is a Cockcroft-Walton circuit, which is a multiple-voltage circuit connected to said second secondary winding, for effecting full-wave rectification of ac voltage outputted from said second secondary winding.

18. A high-voltage power supply circuit according to claim 9, wherein said load is a traveling-wave tube.

19. A high-voltage power supply circuit according to claim 9, wherein said capacitors are multilayer ceramic capacitors.

20. A high-voltage power supply circuit according to claim 9, wherein a midpoint of said secondary winding is not connected to ground potential.

21. A high-voltage power supply circuit that effects rectification and successive multiplication of an ac input, and outputs a high dc voltage, comprising:

a transformer including a primary winding to which an ac voltage is applied, and one secondary winding formed of a number of turns according to a desired step-up voltage;

a plurality of diode bridges connected in series via a first plurality of capacitors with said secondary winding for effecting full-wave rectification of ac voltage outputted from said secondary winding;

a second plurality of capacitors respectively provided for said diode bridges for accumulating charges by output voltage that has undergone said full-wave rectification; and means for connecting a load between ground potential and an output terminal of a last-stage diode bridge farthest from said secondary winding, wherein, of said plurality of diode bridges, an output terminal of a first-stage diode bridge closest to said secondary winding is connected to said ground potential, and said load is connected between said output terminal of said last-stage diode bridge and an output terminal of a diode bridge that is a desired number of stages in a direction away from said last-stage diode bridge toward said first-stage diode bridge.

22. A high-voltage power supply circuit that effects rectification and successive multiplication of an ac input, and outputs a high dc voltage, comprising:

a transformer including a primary winding to which an ac voltage is applied, and one secondary winding formed of a number of turns according to a desired step-up voltage;

a plurality of diode bridges connected in series via a first plurality of capacitors with said secondary winding for effecting full-wave rectification of ac voltage outputted from said secondary winding;

a second plurality of capacitors respectively provided for said diode bridges for accumulating charges by output voltage that has undergone said full-wave rectification;

means for connecting a load between ground potential and an output terminal of a last-stage diode bridge farthest from said secondary winding, wherein, of said plurality of diode bridges, an output terminal of a first-stage diode bridge closest to said secondary winding is connected to said ground potential; and a dc power supply for applying a desired dc voltage with respect to said ground potential to said output terminal of said first-stage diode bridge closest to said secondary winding.

23. A high-voltage power supply circuit that effects rectification and successive multiplication of an ac input, and outputs a high dc voltage, comprising:

a transformer including a primary winding to which an ac voltage is applied, and one secondary winding formed of a number of turns according to a desired step-up voltage;

a plurality of diode bridges connected in series via a first plurality of capacitors with said secondary winding for effecting full-wave rectification of ac voltage outputted from said secondary winding;

a second plurality of capacitors respectively provided for said diode bridges for accumulating charges by output voltage that has undergone said full-wave rectification;

means for connecting a load between ground potential and an output terminal of a last-stage diode bridge farthest from said secondary winding, wherein, of said plurality of diode bridges, an output terminal of a first-stage diode bridge closest to said secondary winding is connected to said ground potential, and said load is connected between said output terminal of said last-stage diode bridge and an output terminal of a diode bridge that is a desired number of stages in a direction away from said last-stage diode bridge toward said first-stage diode bridge; and a dc power supply for applying a desired dc voltage with respect to said ground potential to said output terminal of said first-stage diode bridge closest to said secondary winding.

24. A high-voltage power supply circuit that effects rectification and successive multiplication of an ac input, and outputs a high dc voltage, comprising:

a transformer including a primary winding to which an ac voltage is applied, and one secondary winding formed of a number of turns according to a desired step-up voltage;

a plurality of diode bridges connected in series via a first plurality of capacitors with said secondary winding for effecting full-wave rectification of ac voltage outputted from said secondary winding;

a second plurality of capacitors respectively provided for said diode bridges for accumulating charges by output voltage that has undergone said full-wave rectification; and means for connecting a load between ground potential and an output terminal of a last-stage diode bridge farthest from said secondary winding, wherein, of said plurality of diode bridges, an output terminal of a first-stage diode bridge closest to said secondary winding is connected to said ground potential, and said load is a traveling-wave tube.

* * * * *